(12) United States Patent
Fukushima et al.

(10) Patent No.: US 6,637,982 B2
(45) Date of Patent: Oct. 28, 2003

(54) GAS TRANSPORTATION METHOD FOR GRAIN

(75) Inventors: Yukio Fukushima, Chiyoda-ku (JP);
Masaaki Miyamoto, Chiyoda-ku (JP);
Seiki Mitomo, Chiyoda-ku (JP);
Tatsunori Saigusa, Chiyoda-ku (JP);
Shoken Takahashi, Matudo (JP)

(73) Assignee: Hitachi Plant Engineering & Construction Co., Ltd., Tokyo (JP)

( * ) Notice: Subject to any disclaimer, the term of this patent is extended or adjusted under 35 U.S.C. 154(b) by 0 days.

(21) Appl. No.: 10/043,184

(22) Filed: Jan. 14, 2002

(65) Prior Publication Data

US 2003/0133760 A1 Jul. 17, 2003

(51) Int. Cl.⁷ .............................................. B65G 53/00
(52) U.S. Cl. ......................................... 406/197; 406/10
(58) Field of Search ................................... 406/10, 197

(56) References Cited

U.S. PATENT DOCUMENTS

| | | | |
|---|---|---|---|
| 3,946,496 A | * 3/1976 | Sukup | 34/575 |
| 4,270,280 A | * 6/1981 | McClaren | 34/493 |
| 4,599,809 A | * 7/1986 | Parkes | 34/484 |
| 4,630,975 A | * 12/1986 | Becker | 406/85 |
| 4,704,804 A | * 11/1987 | Wyatt et al. | 34/415 |
| 5,248,222 A | * 9/1993 | Littman et al. | 406/142 |
| 5,598,770 A | * 2/1997 | Campbell et al. | 99/487 |
| 6,318,000 B1 | * 11/2001 | Satake et al. | 34/168 |

FOREIGN PATENT DOCUMENTS

| | | |
|---|---|---|
| JP | 52-20582 | 2/1977 |
| JP | A 2-56255 | 2/1990 |
| JP | A 7-330151 | 12/1995 |

* cited by examiner

*Primary Examiner*—Joseph A. Dillon
(74) *Attorney, Agent, or Firm*—Oliff & Berridge, PLC.

(57) ABSTRACT

It is an object of the present invention to provide a method which is capable of reducing a crushing rate of grain when the grain such as rice is transported by means of gas through pipes. The temperature of the grain in a grain accommodation tank which is connected to a transportation pipe for grain is measured. A temperature signal indicating this temperature is sent to control means, which determines the temperature of transportation gas so that a difference between this temperature and the temperature of the grain is within a predetermined range. The determined temperature is transmitted to an intercooler so that the temperature of the transportation gas which is sent from a blower and flows through the transportation pipe is controlled to be at the determined specific temperature. Transportation of the grain by means of the transportation gas at this temperature prevents the grain from crushing.

7 Claims, 5 Drawing Sheets

GAS TRANSPORTATION METHOD FOR GRAIN

BACKGROUND OF THE INVENTION

1. Field of the Invention

The present invention relates to a gas transportation method for grain, and more particularly to a method for transporting grain with low hardness such as rice by means of gas.

2. Description of Related Art

Conventionally, in rice polishing factories and boiled rice factories, delivered unpolished rice is usually polished by a rice polishing machine to be half-polished rice, and the half-polished rice is processed to be polished rice with its rice bran removed. This polished rice is stored, blended with various kinds of polished rice and wrapped to be shipped, or is used immediately for boiled rice. In various transportation processes of transporting rice from an unpolished rice storage tank to the rice polishing machine, from the rice polishing machine to a rice bran removing machine, from the rice bran removing machine to a polished rice storage tank, from the polished rice storage tank to a blended rice accommodation tank, and so on, a number of transportation apparatus such as bucket conveyers, lifts, horizontal belt conveyers, and the like are usually used.

However, these transportation apparatus tend to become upsized as factories become large, which has resulted in difficulty in assembly, installation, and maintenance thereof. Furthermore, since rice bran remains in gap parts in these transportation apparatus, microbes such as mold may grow to gather insects and so on eating the mold. This has brought about a problem that values of rice and boiled rice as products may possibly be lost. Since the transportation apparatus need to be frequently disassembled for cleaning in order to eliminate the problem, a problem has been further caused that maintenance cost is increased.

To solve these problems, apparatus for pneumatically transporting rice through pipes are known as are disclosed in Japanese Patent Laid-open No. Hei 7-330151, Japanese Patent Laid-open No. Hei 2-56255, and Japanese Patent Laid-open No. Sho 52-20582. In these apparatus, grain such as rice is transported by air streams which are generated in pipes with the use of blowers and compressors. The use of such a pneumatic transportation method makes it possible to avoid the problem that the rice bran remains halfway in the pipes since the rice and the air are transported in the pipes which are shielded from the outside.

However, in the conventional pneumatic transportation method, problems have often occurred that transported rice is crushed or each grain of rice cracks to reduce the value of the rice as a product. Since consumers demand high quality, particularly for rice to be used for boiled rice, sufficient quality control is required. However, it has been very difficult to transport rice pneumatically without causing any crush or crack to the rice.

The present invention is made in view of the conventional problems as described above and it is an object of the present invention to provide a gas transportation method and apparatus which are capable of preventing transported grain such as rice from crushing or cracking.

SUMMARY OF THE INVENTION

Transportation methods by means of gas such as air are generally divided into a high-pressure transportation method in which the pressure of supplied air is set at a value equal to 200 kPa (kilopascal) or more and a low-pressure transportation method in which the pressure of the supplied air is suppressed at a low value. In the high-pressure transportation method, pressurizing air flows through transportation pipes at a high speed when transportation is finished so that substances moving though the pipes may possibly collide with inner wall surfaces of the pipes to be crushed. Hardness of grain such as rice is generally in a lower range of $11 \leq Hv \leq 14$ in terms of Vickers hardness Hv and since crush and crack of grain during transportation affect its quality, the low-pressure transportation method in which the pressure of the supplied air is suppressed at a low value is appropriate for pneumatic transportation of grain. However, when grain is transported through pneumatic transportation pipes in which transportation passages are long and curved, pressure loss is caused. Therefore, making allowance for this pressure loss, air pressure of a supplying source is generally set at approximately 50 kPa. Transportation of grain through the pipes under this pressure causes the possibility that the grain may be damaged, and therefore, a countermeasure for this problem is required.

Next, findings obtained by the inventors of the present invention are explained. As a result of various studies on correlation of a collision speed of polished rice with its crushing rate and cracking rate, the inventors of the present invention have found that a velocity V of transportation gas needs to be in a range from 10 m/s to 20 m/s. FIG. 1 is a graph showing correlation between a collision speed and rates of occurrence of crushed granules of polished rice and of occurrence of cracked plus crushed granules of polished rice. Here, the crushed granules of polished rice mean polished rice which is crushed to be broken into pieces and therefore, is difficult to be used as boiled rice and can be used only for materials for confectionary, rice crackers, or the like. The cracked granules mean polished rice which only has cracks therein and can be used as boiled rice. This experiment was conducted, using a device in which a blower 82 is disposed at one end of an acryl pipe 81 having length of 1000 mm and a stainless plate 83 is disposed vertically in a position 25 mm away from an exit at the other end of the acryl pipe 81, as shown in FIG. 2. Damage condition of polished rice 84 was examined after the polished rice 84 was put at an end part on a blower 82 side inside the acryl pipe 81 as shown in FIG. 2 and was pneumatically transported by the blower 82 to be collided with the stainless plate 83 at a collision angle of 90 degrees.

It is apparent from FIG. 1 that the occurrence rate of crushed granules or cracked and crushed granules of the polished rice suddenly increases when the collision speed exceeds 20 m/s. Therefore, the velocity V of the transportation air needs to be set at a value equal to 20 m/s or less. Meanwhile, in order to secure an amount of transported rice in pneumatic transportation, the velocity V of the transportation air needs to be set at a value equal to 10 m/s or more. Based on the above findings, it has been found that the velocity V of the transportation air needs to be set at a value in a range of $10 \text{ m/s} \leq V \leq 20 \text{ m/s}$.

The inventors of the present invention have also obtained correlation of a difference in temperature between polished rice and transportation air with damage to the polished rice under the condition that the velocity V of the transportation air is fixed (V=20 m/s), using the experiment device shown in FIG. 2. In this experiment, the polished rice 84 is put and kept unmoved in the air whose temperature is 20° C. and whose humidity is 70%, and thereafter, the polished rice 84 whose temperature has reached 20° C. is put at one end on the blower 82 side of the acryl pipe 81, while an air stream generated by the blower 82 is supplied with its temperature adjusted by a heater 85 to vary its difference in temperature from that of the polished rice 84. Similarly to the aforesaid experiment, the damage condition of the polished rice 84 was examined after the polished rice 84 was pneumatically transported by the blower 82 to be collided with the stainless plate 83 at the collision angle of 90 degrees.

The result of the experiment is shown in FIG. 3. In FIG. 3, the horizontal axis shows a difference in temperature (°C.) between the polished rice and the transportation air and the vertical axis shows an occurrence rate of crushed granules and an occurrence rate of cracked granules of the polished rice. The occurrence rate of crushed granules is shown by the solid line A and the occurrence rate of cracked granules is shown by the broken line B.

It is apparent from FIG. 3 that a crushing rate of the polished rice varies depending on the temperature difference between the polished rice and the transportation air. For example, the result of the experiment in FIG. 1 shows that the crushing rate of the polished rice is approximately 15% under the condition of the velocity of V=20 m/s, but the result of the experiment in FIG. 3 shows that the crushing rate of the polished rice increases to approximately 22% or more under the condition that the temperature difference between the polished rice and the transportation air is 20° C. or more.

The inventors of the present invention have found from the experiment result shown in FIG. 3 that crushed granules do not occur when the temperature difference between the polished rice and the transportation air is 10° C. or less. Therefore, when the polished rice is transported by transportation air flowing through transportation pipes which are connected with tanks for accommodating the polished rice therein, it is appropriate that the transportation air whose temperature difference from that of the polished rice flowing into the tanks or the polished rice flowing out of the tanks is 10° C. or less is supplied into the transportation pipes to transport the polished rice. Basically, it is appropriate that the temperature of the transportation air is equal to the temperature of the polished rice, but it has been found that in an actual apparatus, the temperature difference of the transportation air from that of the polished rice may be within a range of ±15° C., and more appropriately, within a range of ±10° C.

The present invention, which is made based on these findings, is a transportation method for grain which is characterized in that it measures the temperature of transported grain and controls the temperature of transportation gas so that a difference between the measured temperature of the grain and the temperature of the transportation gas is adjusted to be in a predetermined range, when the grain is transported by means of gas flowing through a transportation pipe.

The difference between the measured temperature of the grain and the temperature of the transportation gas is appropriately within a range of ±15° C. Furthermore, it is appropriate that the humidity of the transportation gas is controlled to be substantially equal to equilibrium humidity of the grain.

It is appropriate that the grain is rice.

DETAILED DESCRIPTION OF THE PREFERRED EMBODIMENTS

A preferred embodiment of a gas transportation method for grain according to the present invention is explained in detail below with reference to the drawings.

Figure 1:
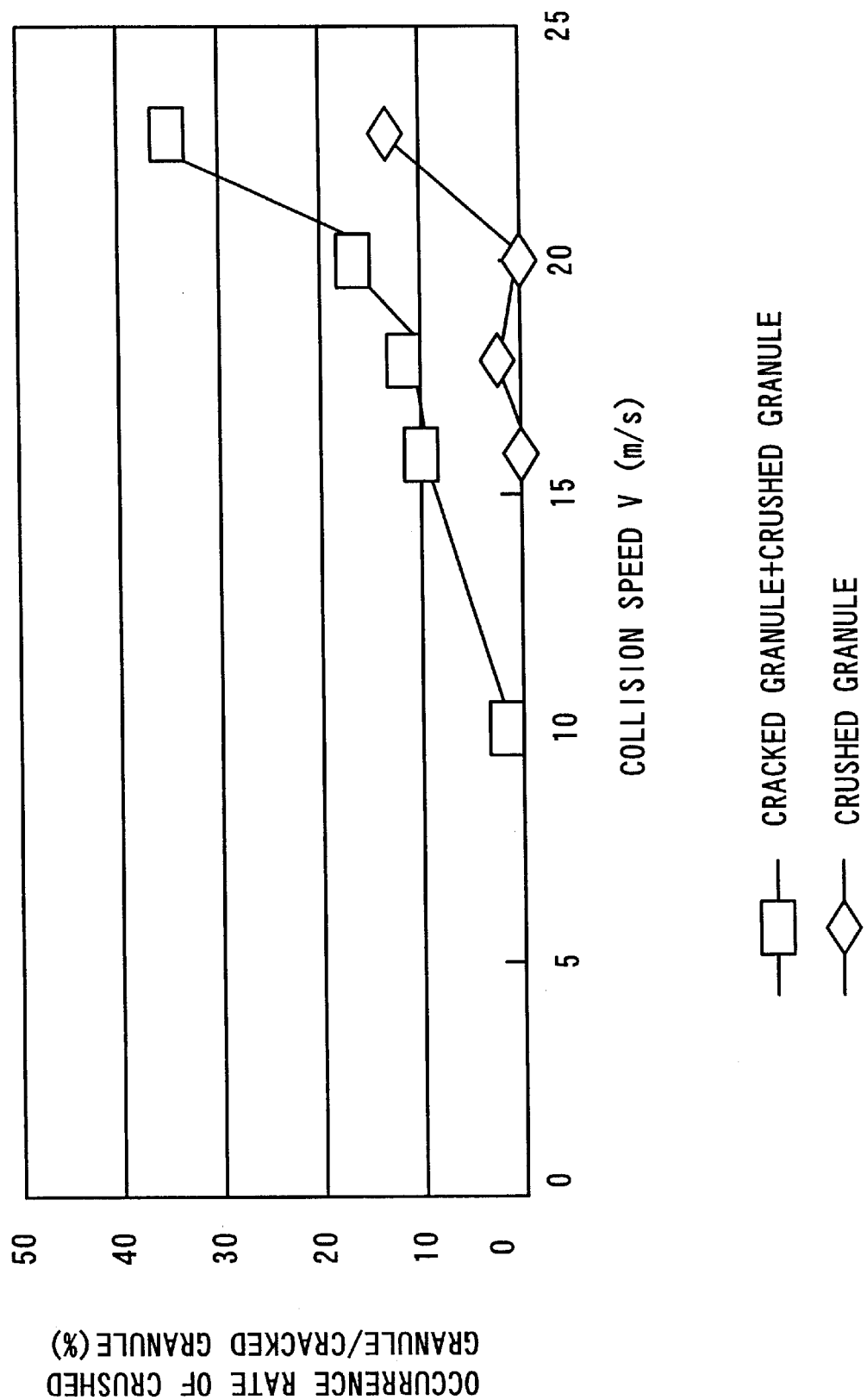
FIG. 1 is a graph showing correlation of a collision speed with an occurrence rate of crushed granules and of cracked plus crushed granules of polished rice when the polished rice is collided with a wall surface at a right angle.
Figure 2:
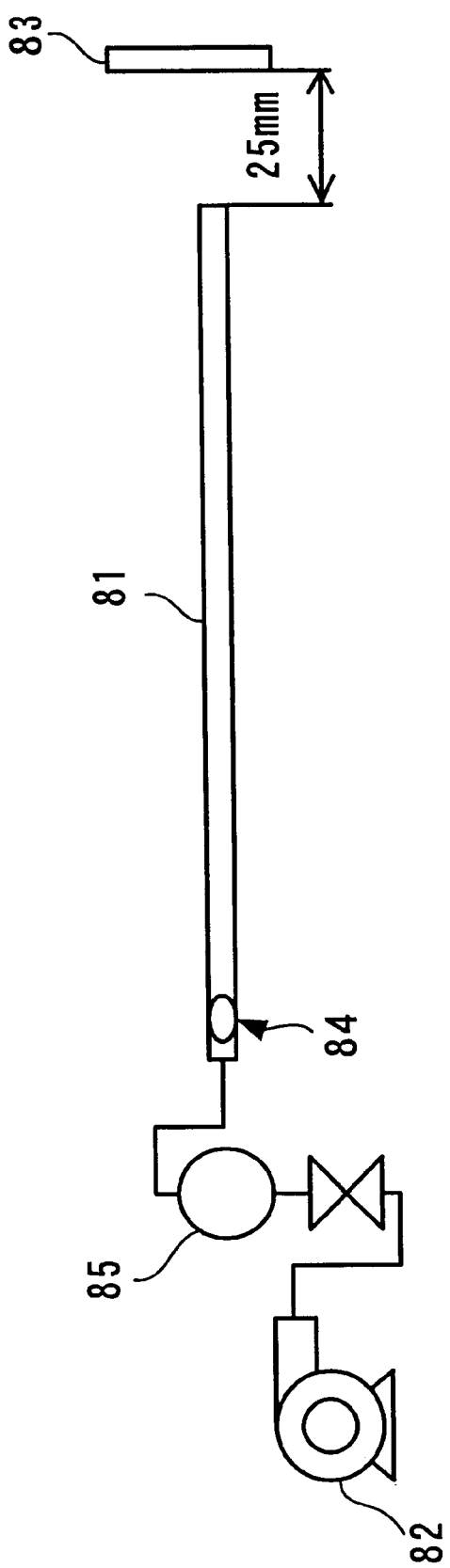
FIG. 2 is an explanatory view of a device used for the experiment in FIG. 1.
Figure 3:
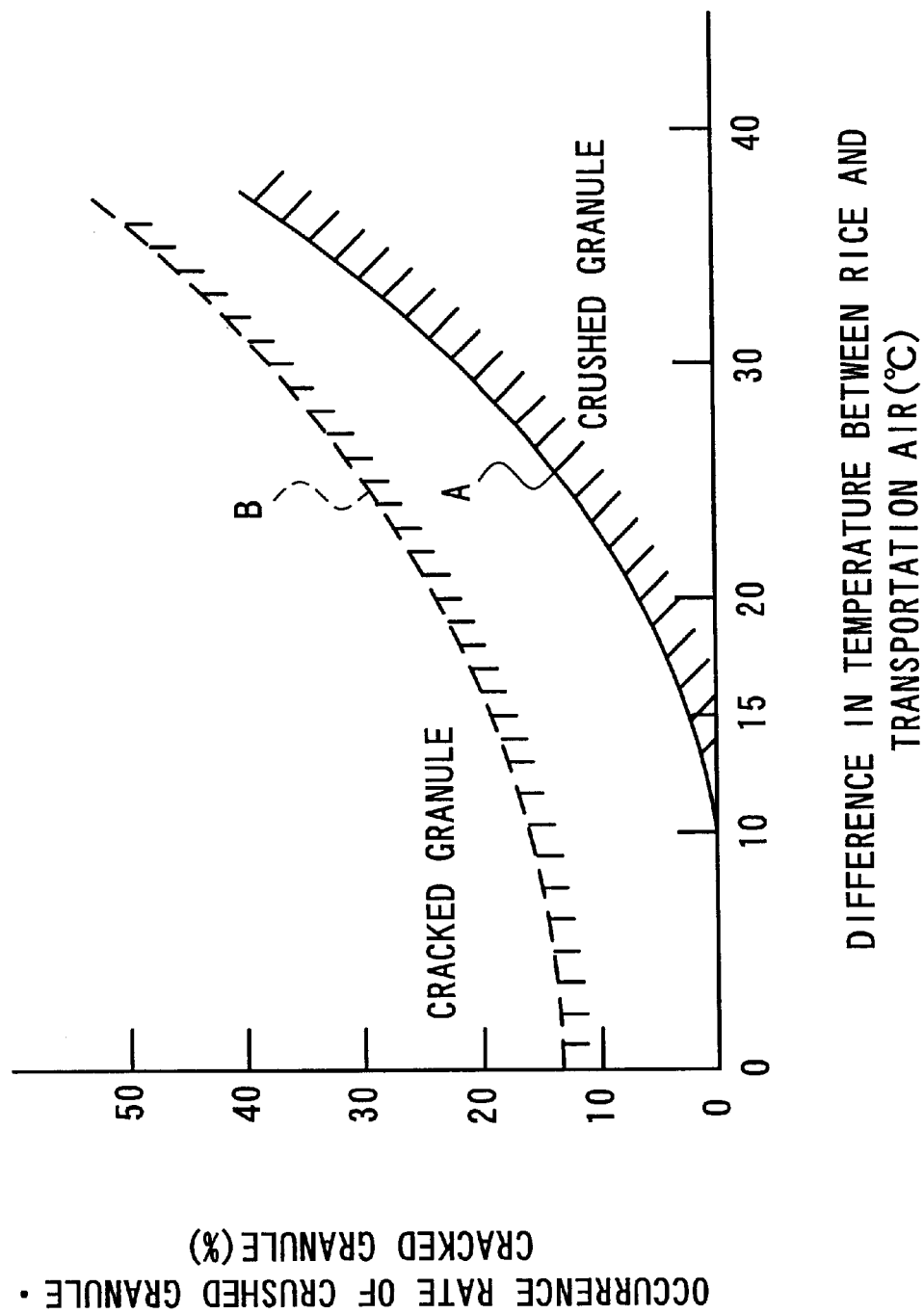
FIG. 3 is a graph showing correlation of a difference in temperature between the polished rice and the transportation air with an occurrence rate of crushed granules and an occurrence rate of cracked granules of the polished rice.
Figure 4:
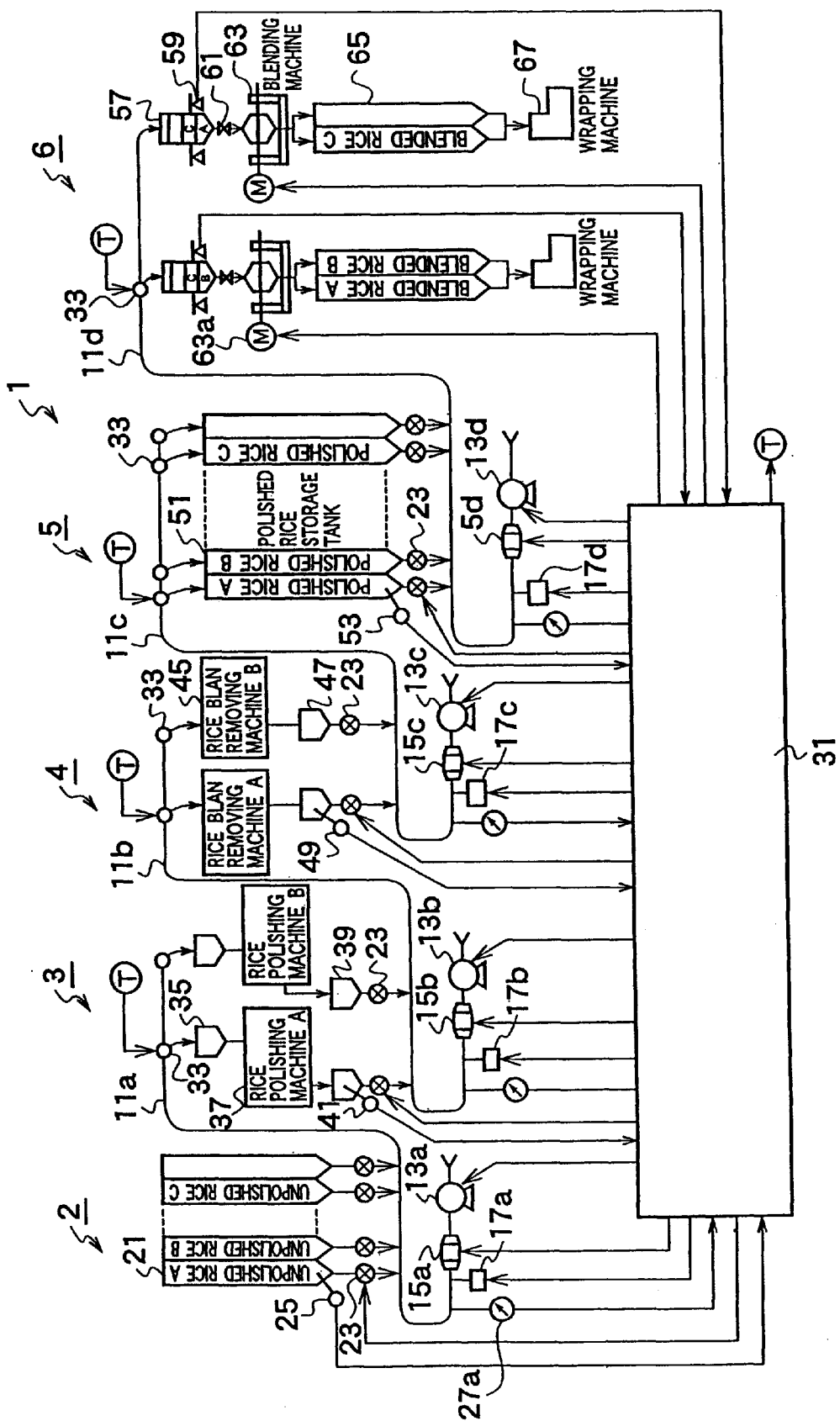
FIG. 4 is an explanatory block diagram of a transportation apparatus for rice showing one embodiment of the present invention.

FIG. 4, showing one embodiment of the gas transportation method for grain according to the present invention, is an explanatory block diagram of an apparatus in a case where the present invention is applied to pneumatic transportation of rice.

In FIG. 4, a transportation apparatus 1 for rice has a structure in which four stages of transportation pipes 11 through which pneumatic transportation is performed are connected in series. The transportation apparatus 1 is composed of an unpolished rice storage section 2 for storing unpolished rice therein, a rice polishing section 3 for polishing the unpolished rice to make half-polished rice, a rice bran removing section 4 for removing rice bran from the half-polished rice to make polished rice, a polished rice storage section 5 for storing the polished rice therein, and a blending section 6 for blending various kinds of polished rice stored in the polished rice storage section 5.

The transportation pipes 11 are composed of a first transportation pipe 11a for connecting the unpolished rice storage section 2 with the rice polishing section 3, a second transportation pipe 11b for connecting the rice polishing section 3 with the rice bran removing section 4, a third transportation pipe 11c for connecting the rice bran removing section 4 with the polished rice storage section 5, and a fourth transportation pipe 11d for connecting the polished rice storage section 5 with the blending section 6. It is necessary that curvature of passages of these transportation pipes 11 is set at a value at least equal to 500 mmR or more (more appropriately, about 1000 mmR) to prevent rice from colliding with inner walls of the pipes at an acute angle.

The transportation pipes 11 are provided at respective starting ends thereof with blowers 13 for sending an air stream and intercoolers 15 which are disposed inside the pipes on downstream sides of the blowers 13, for heating or cooling transportation air according to the temperature of the rice to adjust the temperature of the transportation air. By putting the blowers 13 and the intercoolers 15 into operation, the air whose temperature is adjusted at a value appropriate for the rice moving toward terminal ends of the transportation pipes 11 is sent into the transportation pipes 11. Moreover, humidifying/dehumidifying devices 17 are provided on downstream sides of the intercoolers 15 to adjust the humidity of the transportation air to be equal to equilibrium humidity of the rice. Here, the equilibrium humidity of the rice, which means the humidity at which rice does not absorb or discharge moisture, is approximately 70%.

Each of the transportation pipes 11a, 11b, 11c, and 11d is explained as follows. In the first transportation pipe 11a, a first blower 13a, a first intercooler 15a, and a first humidifying/dehumidifying device 17a are disposed; in the second transportation pipe 11b, a second blower 13b, a second intercooler 15b, and a second humidifying/dehumidifying device 17b are disposed; in a third transportation pipe 11c, a third blower 13c, a third intercooler 15c, and a third humidifying/dehumidifying device 17c are disposed; and in a fourth transportation pipe 11d, a fourth blower 13d, a fourth intercooler 15d, and a fourth humidifying/dehumidifying device 17d are disposed.

The unpolished rice storage section 2 is provided with a plurality of first storage tanks 21 for storing unpolished rice therein, and the first storage tanks 21 are connected with the first transportation pipe 11a at parts on a downstream side of the first blower 13a, the first intercooler 15a, and the humidifying/dehumidifying device 17a via respective rotary feeders 23. When the transportation air is supplied to the first transportation pipe 11a by the first blower 13a, the unpolished rice discharged from the first storage tanks 21 by the respective rotary feeders 23 is transported toward the rice polishing section 3 which is disposed at a terminal end of the first transportation pipe 11a.

Figure 5:
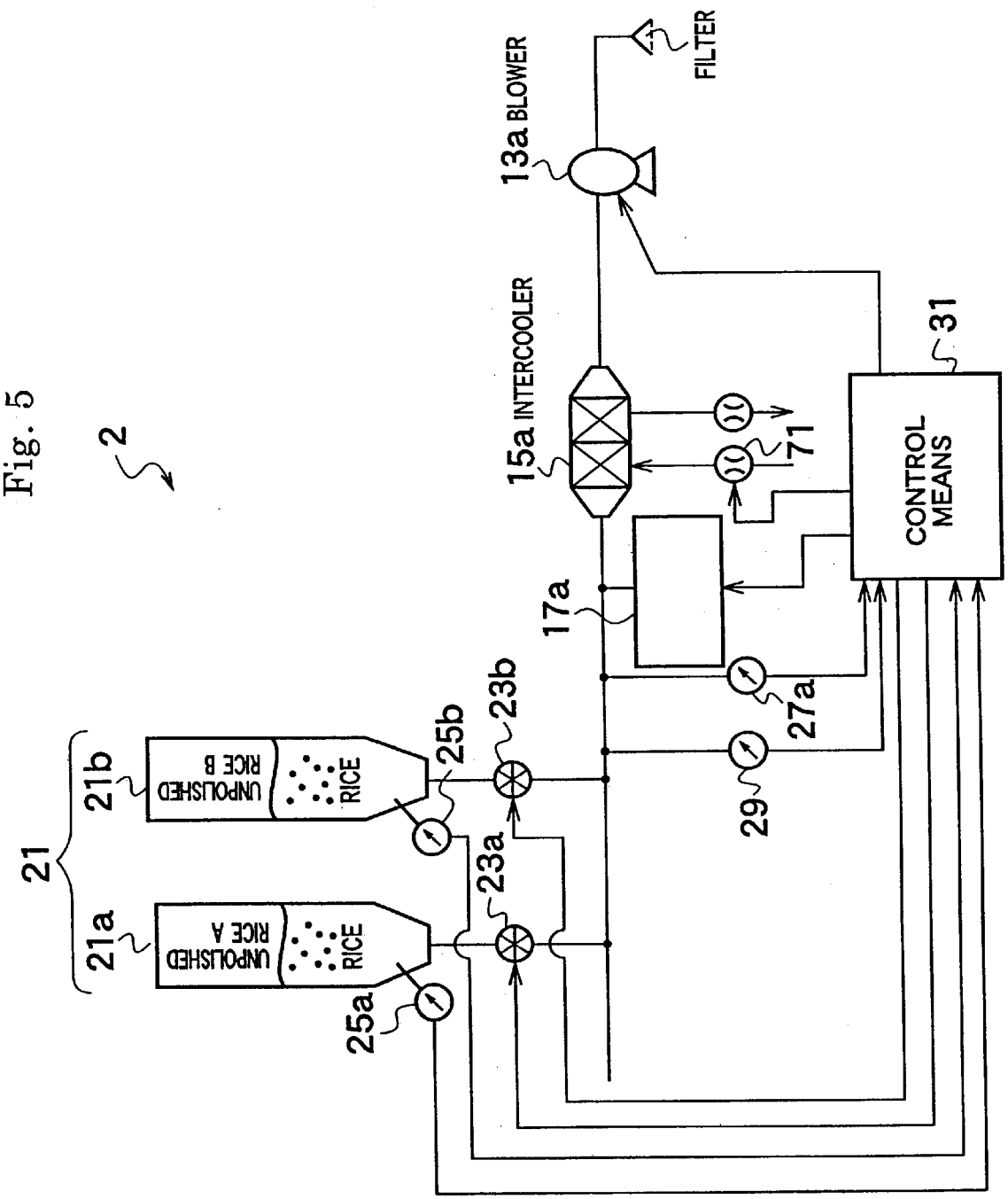
FIG. 5 is a fragmentary enlarged view of the transportation apparatus for rice in FIG. 4.

All of first storage tanks 21A, 21B, 21C . . . , and so on are provided with unpolished rice temperature sensors 25 for measuring respective temperatures of stored unpolished rice A, B, C . . . , and so on, and temperature signals indicating the temperatures measured by the unpolished rice temperature sensors 25 are transmitted to control means 31. The control means 31 stores the temperatures of the first intercooler 15a corresponding to the temperatures of the unpolished rice measured by the unpolished rice temperature sensors 25 and controls a difference in temperature between the unpolished rice and the transportation air to be within a predetermined range. Alternatively, feed back control is also appropriate in which a temperature sensor 29 (shown in FIG. 5) for measuring the temperature of the air is provided inside the first transportation pipe 11a on a downstream side of the first intercooler 15a and the humidifying/dehumidifying device 17a as shown in FIG. 5, and the control means 31 receives a temperature signal indicating the measured temperature to adjust the temperature of the first intercooler 15a. Furthermore, a humidity sensor 27a for measuring the humidity of the transportation air from the first intercooler 15a is also provided in the first transportation pipe 11a, and a humidity signal indicating the humidity measured by the humidity sensor 27a is transmitted to the control means 31. Based on this humidity signal, the control means 31 outputs an instruction to the humidifying/dehumidifying device 17a so that the humidity of the transportation air is adjusted to be equal to the equilibrium humidity (approximately 70%) of the rice, for example, by generation of vapor, and the control means 31 causes the transportation air to be supplied to the first transportation pipe 11a.

The rice polishing section 3 is provided with a plurality of branch valves 33 which are disposed in series in the first transportation pipe 11a, for sending the unpolished rice which is transported thereto to either one of branching-off passages. By the changeover operation of the branch valve 33 designated by an instruction from the control means 31, the unpolished rice which has passed through either one of the branching-off passages is sent to a corresponding rice polishing machine 37 via a corresponding first accommodation tank 35 to be processed into half-polished rice. Incidentally, the structure in which the changeover operation is performed at a branching angle of 30° or less so as not to have branching lines make sharp curves at the branch valves 33 prevents the unpolished rice from crushing due to collision. Under the rice polishing machines 37, a plurality of second accommodation tanks 39 for storing half-polished rice and storing various kinds of half-polished rice to be supplied to a starting end side of the second transportation pipe 11b are disposed.

The plural second accommodation tanks 39 are connected with the second transportation pipe 11b at parts on a downstream side of the second blower 13b and the second intercooler 15b via respective rotary feeders 23. Supplying the transportation air to the second transportation pipe 11b by the second blowers 13b causes the half-polished rice which is discharged from the second accommodation tanks 39 by the respective rotary feeders 23 to be transported to the rice bran removing section 4 which is disposed at a terminal end of the second transportation pipe 11b. In the second accommodation tanks 39, half-polished rice temperature sensors 41 for measuring the temperatures of the stored half-polished rice are provided and temperature signals indicating the temperatures measured by the half-polished rice temperature sensors 41 are transmitted to the control means 31. Furthermore, a humidity sensor 27b for measuring the humidity of the transportation air from the second intercooler 15b is provided in the second transportation pipe 11b and a humidity signal from the humidity sensor 27b is transmitted to the control means 31. The control means 31 receives the temperature signals and the humidity signal to perform control operation in the same manner as previously described.

The rice bran removing section 4 is provided with a plurality of branch valves 33 which are connected in series in the second transportation pipe 11b, for sending the half-polished rice which is transported thereto to either one of branching-off passages. By the changeover operation of the branch valve 33 designated by an instruction from the control means 31, the half-polished rice which has passed through either one of the branching-off passages is sent to a corresponding rice bran removing machine 45 to be processed into polished rice with its rice bran removed. Under the rice bran removing machines 45, a plurality of third accommodation tanks 47 for storing the polished rice from which rice bran has been removed and storing various kinds of polished rice to be supplied to a starting end side of the third transportation pipe 11c are disposed.

The plural third accommodation tanks 47 are connected with the third transportation pipe 11c at parts on a downstream side of the third blower 13c and the third intercooler 15c via respective rotary feeders 23. Supplying the transportation air to the third transportation pipe 11c by the third blower 13c causes the polished rice which is discharged from the third accommodation tanks 47 by the respective rotary feeders 23 to be transported to the polished rice storage section 5 which is disposed at a terminal end of the third transportation pipe 11c. In the third accommodation tanks 47, polished rice temperature sensors 49 for measuring the temperatures of the stored polished rice are provided and temperature signals indicating the temperatures measured by the polished rice temperature sensors 49 are transmitted to the control means 31. Furthermore, a humidity sensor 27c for measuring the humidity of the transportation air from the third intercooler 15c is provided in the third transportation pipe 11c and a humidity signal from the humidity sensor 27c is transmitted to the control means 31. The control means 31 receives the temperature signals and the humidity signal to perform control operation in the same manner as previously described.

The polished rice storage section 5 is provided with a plurality of branch valves 33 which are disposed in series in the third transportation pipe 11c, for sending the polished rice which is transported thereto to either one of branching-off passages. By the changeover operation of the branch valve 33 designated by an instruction from the control means 31, the polished rice which has passed through either one of the branching-off passages is stored in a predetermined polished rice storage tank 51.

The plural polished rice storage tanks 51 are connected with the fourth transportation pipe 11d at parts on a downstream side of the fourth blower 13d and the fourth intercooler 15d via respective rotary feeders 23. Supplying the transportation air to the fourth transportation pipe 11d by the fourth blowers 13d causes the polished rice which is discharged from the polished rice storage tanks 51 by the respective rotary feeders 23 to be transported toward the blending section 6 which is disposed at a terminal end of the fourth transportation pipe 11d. In the polished rice storage tanks 51, stored polished rice temperature sensors 53 for measuring the temperatures of the stored polished rice are provided and temperature signals indicating the temperatures measured by the stored polished rice temperature sensors 53 are transmitted to the control means 31. Furthermore, a humidity sensor 27d for measuring the humidity of the transportation air from the fourth intercooler 15d is provided in the fourth transportation pipe 11d and a humidity signal from the humidity sensor 27d is transmitted to the control means 31. The control means 31 receives the temperature signals and the humidity signal to perform control operation in the same manner as described above.

The blending section 6 is provided with a plurality of branch valves 33 which are disposed in series in the fourth transportation pipe 11d, for sending the stored polished rice which is transported thereto to either one of the branching-off passages. By the changeover operation of the branch valve 33 designated by an instruction from the control means 31, the stored polished rice which has passed through the branching-off passage is accommodated in a corresponding measuring tank 57. The measuring tanks 57 are provided with load sensors 59 attached thereto, which measure the weights of kinds of polished rice A, B, C . . . , and so on which are transported via the fourth transportation pipe 11d and the branch valves 33 to transmit the measured weights to the control means 31. When set specific amounts of various kinds of the polished rice A, B, C . . . , and so on are transported to and accommodated in the measuring tanks 57, valves 61 are opened to send the polished rice to blending machines 63. The blending machines 63 are driven to be rotated by motors 63a according to instructions from the control means 31 and blend various kinds of the polished rice A, B, C, . . . , and so on to make blended rice. The blended rice is wrapped by wrapping machines 67 and shipped after being accommodated in blended rice accommodation tanks 65.

Incidentally, the control means 31 is connected with not-shown driving devices for driving the first blower 13a, the second blower 13b, the third blower 13c, and the fourth blower 13d to control the respective blowers to start driving and stop driving. Furthermore, the control means 31 is connected with not-shown operating devices for operating the rotary feeders 23 and the branch valves 33 to control the start and stop of their operations and outputs instructions to these devices that the rice such as the unpolished rice, the half-polished rice, and the polished rice should be supplied to a predetermined one of the storage tanks, accommodation tanks, rice bran removing machines 45, measuring tanks 57, and so on from the pipes. The order of operations of the blowers 13, the intercoolers 15, the rotary feeders 23, the branch valves 33, the rice polishing machines 37, the rice bran removing machines 45, the blending machines 63, and so on is determined by inputs to the control means 31 according to a required kind of blended rice, a required amount of rice, a shipment situation, and so on. The above-mentioned rotary feeders 13 are discharge devices which have space partitioned by blades arranged at equal spaced intervals on the circumferences thereof and are driven by not-shown electric motors, and they are structured to discharge predetermined amounts of rice by their rotation. The branch valves 33 are disposed in series, among which only the branch valve 33 receiving an instruction signal from the control means 31 is changed over at the time of operation to transport the rice from the transportation pipes in a branching-off manner.

In this embodiment, unpolished rice is pneumatically transported from the unpolished rice storage section 2 for storing unpolished rice therein to the rice polishing section 3 which is disposed on a subsequent stage, for polishing unpolished rice, and half-polished rice is pneumatically transported from the rice polishing section 3 to the rice bran removing section 4 for removing rice bran to make polished rice, and furthermore, polished rice is pneumatically transported from the rice bran removing section 4 to the polished rice storage section 5 for storing polished rice therein. This pneumatic transportation is performed by each of the blowers 13 and each of the rotary feeders 23 in each of the processing sections as described above, and they are controlled by the control means 31.

The velocity V of the transportation air generated by the blowers 13 is controlled by the control means 31 and is controlled to be at the following value as described above. Namely, the velocity V of the transportation air supplied from each of the blowers 13a, 13b, 13c, and 13d is controlled to be within the following range:

[Numerical Formula 1]

$$10 \text{ m/s} \leq V \leq 20 \text{ m/s}$$

The control means 31 is connected with the first intercooler 15a, the second intercooler 15b, the third intercooler 15c, and the fourth intercooler 15d as shown in FIG. 4 and it outputs instructions to the intercoolers 15 so that differences between the rice temperatures received from the rice temperature sensors and the transportation air temperature are controlled to be within a predetermined range. In order to cool gas warmed in the blowers 13, the intercoolers 15 generally output instructions to coolant valves 71 for controlling coolant to control the temperature of the transportation air. More specifically, the control means 31 stores the temperatures of the rice and the temperature of the transportation air whose temperature difference from the rice temperatures is within a range of ±15° C. and controls the intercoolers 15 so that the difference in temperature between the rice and the transportation air is within the range of ±15° C. More appropriately, the difference in temperature is controlled to be within a range of ±10° C.

The control means 31 is also connected with the humidifying/dehumidifying devices 17a, 17b, 17c, and 17d and outputs instructions to the humidifying/dehumidifying devices 17a, 17b, 17c, and 17d so that the humidity of the transportation air is controlled to be equal to the equilibrium humidity of the rice. At this time, the control means 31 stores the value of the humidity of the transportation air as approximately 70% which is the equilibrium humidity of the rice and controls the humidifying/dehumidifying devices 17a, 17b, 17c, and 17d so that the humidity of the transportation air is adjusted to be approximately 70% which is the equilibrium humidity of the rice after receiving the humidity signals of the transportation air from the humidity sensors 27a, 27b, 27c, and 27d.

Incidentally, the above-mentioned respective ranges for the velocity V of the transportation air, the temperature of the transportation air, and the humidity of the transportation air are determined based on the result of the experiment on polished rice which was conducted by the inventors of the present invention, as previously described. Therefore, these ranges are appropriate for controlling the rice polishing section 3, the rice bran removing section 4, the polished rice storage section 5, and the blending section 6 which deal with polished rice, but the unpolished rice storage section 2 which deals with unpolished rice is also controlled under the condition of these ranges. This is because unpolished rice is not crushed so easily as polished rice owing to its higher strength than that of polished rice, and therefore, severer control can be realized when the unpolished storage section 2 is controlled under the same condition as that of the devices which deal with polished rice.

Next, the procedure for supplying rice using the transportation apparatus 1 as structured above is explained.

First, the temperature of designated unpolished rice (for example, rice A) stored in the first storage tank 21 is measured by the corresponding unpolished rice temperature sensor 25 and a temperature signal indicating the measured temperature is transmitted to the control means 31. The control means 31 determines the temperature of the transportation air according to the measured temperature of the unpolished rice so that the difference in temperature between the unpolished rice and the transportation air is 15° C. or less, outputs an instruction to adjust the air flowing in the first intercooler 15a to be at the determined temperature, and puts the coolant valve 71 of the first intercooler 15a into operation. At this time, the control means 31 also outputs an instruction to the driving source for driving the first blower 13a so that the transportation air whose velocity V is in the range of 10 to 20 m/s is generated. The transportation air flowing in the first intercooler 15a is controlled to be at the determined temperature and is supplied to the first transportation pipe 11a. Furthermore, the humidity of the transportation air is measured by the humidity sensor 27a and a humidity signal indicating the measured humidity is transmitted to the control means 31. The control means 31 outputs the instruction to the humidifying/dehumidifying device 17a so that the humidity of the transportation air is controlled to be equal to the equilibrium humidity (approximately 70%) of the rice, for example, by generation of vapor, and causes the transportation air to be supplied to the first transportation pipe 11a.

When the transportation air flowing in the first transportation pipe 11a is kept at the determined velocity, temperature, and humidity, the control means 31 puts the rotary feeder 23a of the designated first storage tank 21a into operation and causes the unpolished rice A to be supplied to the first transportation pipe 11a. The unpolished rice A supplied to the first transportation pipe 11a is transported by the transportation air through the first transportation pipe 11a to flow into the rice polishing section 3. Thereby, the unpolished rice transported through the first transportation pipe 11a is transported under the condition where the temperature difference between the rice and the transportation air is within the set temperature range, regardless of variation in the temperature of the rice depending on seasons such as summer or winter and so on. This makes it possible to reduce the occurrence of crushed granules and cracked granules of the rice.

The unpolished rice A flowing into the rice polishing section 3 is accommodated in a predetermined one of the first accommodation tanks 35 from the first transportation pipe 11a by the changeover operation of the branch valve 33 designated by the control means 31. The accommodated unpolished rice A is polished by the corresponding rice polishing machine 37 provided on a downstream side thereof to be processed into half-polished rice. At this time, the temperature of the half-polished rice increases by approximately 20° C. due to the polishing operation by the rice polishing machine 37. The half-polished rice whose temperature has increased is accommodated in the corresponding second accommodation tank 39 which is disposed on a downstream side of the rice polishing machine 37.

When the rice is continued to be conveyed to a downstream process in the rice-polishing process, the half-polished rice whose temperature has increased is supplied from the second accommodation tank 39 to the second transportation pipe 11b via the rotary feeder 23 which is operated according to an instruction given by the control means 31. At this time, the temperature of the half-polished rice in the second accommodation tank 39 is measured by the half-polished rice temperature sensor 41 and a temperature signal indicating the measured temperature is transmitted to the control means 31. The control means 31 determines the temperature of the transportation air according to the measured temperature of the half-polished rice whose temperature has increased so that the temperature difference between the half-polished rice and the transportation air is adjusted to be 15° C. or less, and the control means 31 outputs an instruction that the air flowing in the second intercooler 15b should be adjusted at the determined temperature and puts the second intercooler 15b into operation. Thereby, the rice transported through the second transportation pipe 11b is transported under the condition that the difference in temperature between the transportation air and the rice is within the set temperature range even if its temperature increases by approximately 20° C. after being polished by the rice polishing machine 37, which reduces the occurrence of crushed granules and cracked granules. Furthermore, the humidity of the transportation air in the second transportation pipe 11b is measured by the humidity sensor 27b and a humidity signal indicating the measured humidity is transmitted to the control means 31. Then, the control means 31 controls the humidifying/dehumidifying device 17b to adjust the humidity of the air inside the second transportation pipe 11b to be substantially equal to the equilibrium humidity of the rice.

At this time, the control means 31 also outputs an instruction to the driving device for driving the second blower 13b to cause the transportation air to be generated. The transportation air flowing in the second intercooler 15b is supplied to the second transportation pipe 11b while being controlled to be at the determined temperature and humidity. Then, the control means 31 puts the rotary feeder 23 of the second accommodation tank 39 into operation and causes the half-polished rice to be discharged to the second transportation pipe 11b. The half-polished rice discharged to the second transportation pipe 11b is transported by the transportation air through the second transportation pipe 11b and transported to the rice bran removing section 4.

In the above description, the case where rice is continued to be conveyed to a downstream process in the rice-polishing process is explained, but in a case where the half-polished rice in the second accommodation tank 39 is conveyed to the downstream process after being accommodated and kept, the same result is also obtained when the temperature in the second accommodation tank 39 is similarly measured by the half-polished rice temperature sensor 41 and the temperature of the transportation air is similarly controlled according to the temperature of the half-polished rice. Thereby, the rice transported through the second transportation pipe 11b is transported under the condition that the temperature difference between the transportation air and the rice is within the set temperature range even if the temperature of the rice increases by approximately 20° C. after being polished by the rice polishing machine 37, which makes it possible to reduce the occurrence of crushed granules and cracked granules. Furthermore, the humidity of the transportation air in the second transportation pipe 11b is measured by the humidity sensor 27b and a humidity signal indicating the measured humidity is transmitted to the control means 31. Then, the control means 31 controls the humidifying/dehumidifying device 17b so that the humidity of the air in the second transportation pipe 11b is adjusted at a value substantially equal to the equilibrium humidity of the rice.

The half-polished rice flowing into the rice bran removing section 4 is sent from the second transportation pipe 11b to a predetermined one of the rice bran removing machines 45 by the changeover operation of the branch valve 33 designated by the control means 31 to be processed into the polished rice with its bran being removed. The polished rice whose bran has been removed is accommodated in the third accommodation tank 47 which is disposed on a downstream side of the predetermined rice bran removing machine 45.

The temperature of the polished rice accommodated in the third accommodation tank 47 is measured by the polished rice temperature sensor 49 and a temperature signal indicating the measured temperature is transmitted to the control means 31. The control means 31 determines the temperature of the transportation air according to the measured temperature of the polished rice whose temperature has increased so that the temperature difference between the polished rice and the transportation air is 15° C. or less, and the control means 31 outputs an instruction that the temperature of the air flowing in the third intercooler 15c should be adjusted at the determined temperature and puts the third intercooler 5c into operation.

At this time, the control means 31 also outputs an instruction to the driving device for driving the third blower 13c and causes the transportation air to be generated. The transportation air flowing in the third intercooler 15c is controlled to be at the determined temperature and supplied to the third transportation pipe 11c. Furthermore, the humidity of the transportation air in the third transportation pipe 11c is measured by the humidity sensor 27c and a humidity signal indicating the measured humidity is transmitted to the control means 31. Then, the control means 31 controls the humidifying/dehumidifying device 17c to adjust the humidity of the transportation air in the second transportation pipe 11c at a value substantially equal to the equilibrium humidity of the rice.

When the transportation air flowing in the third transportation pipe 11c is kept at the determined temperature and humidity, the control means 31 puts the rotary feeder 23 of the aforesaid third accommodation tank 47 into operation and causes the polished rice to be supplied to the third transportation pipe 11c. The polished rice supplied to the third transportation pipe 11c is transported by the transportation air through the third transportation pipe 11c to flow into the polished rice storage section 5. Thereby, the rice transported through the third transportation pipe 11c is transported under the condition that the temperature difference between the rice and the transportation air is within the set temperature range, regardless of the temperature increase due to the rice bran removing operation of the rice bran removing machine 45 and regardless of variation in the temperature of the rice depending on seasons such as summer or winter and so on. This makes it possible to reduce the occurrence of crushed granules and cracked granules of the rice.

The polished rice flowing into the polished rice storage section 5 is stored in a predetermined one of the polished rice storage tanks 51 from the third transportation pipe 11c by the changeover operation of the branch valve 33 designated by the control means 31. The temperature of the polished rice stored in the polished rice storage tank 51 is measured by the stored polished rice temperature sensor 53 and a temperature signal indicating the measured temperature is transmitted to the control means 31. The control means 31 determines the temperature of the transportation air according to the measured temperature of the stored polished rice so that the temperature difference between the polished rice and the transportation air is 15° C. or less, and the control means 31 outputs an instruction that the temperature of the air flowing in the fourth intercooler 15d should be adjusted at the determined temperature and puts the fourth intercooler 15d into operation. Furthermore, the humidity of the transportation air in the fourth transportation pipe 11d is measured by the humidity sensor 27d and a humidity signal indicating the measured humidity is transmitted to the control means 31. Then, the control means 31 controls the humidifying/dehumidifying device 17d to adjust the humidity of the transportation air in the fourth transportation pipe 11d at a value substantially equal to the equilibrium humidity of the rice.

The transportation air flowing in the fourth intercooler 15d is supplied to the fourth transportation pipe 11d while being adjusted at the determined temperature and humidity. When the transportation air flowing in the fourth transportation pipe 11d is kept at the determined temperature, the control means 31 puts the rotary feeder 23 of the aforesaid polished rice storage tank 51 into operation and causes the stored polished rice to be supplied to the fourth transportation pipe 11d. The polished rice supplied to the fourth transportation pipe 11d is transported by the transportation air through the fourth transportation pipe 11d to flow into the blending section 6.

The polished rice flowing into the blending section 6 is accommodated in a predetermined one of the measuring tanks 57 by the changeover operation of the branch valve 33 designated by the control means 31. When each predetermined polished rice is accommodated in a predetermined amount ratio after the designated rice-polishing process as described above is repeated in sequence, the accommodated rice is sent to the blending machine 63. When the predetermined polished rice is accommodated in the measuring tank 57 of the blending section 6, the valve 61 is opened to send the polished rice to the blending machine 63. The blending machine 63 is driven to rotate by the motor 63a and blends various kinds of the polished rice A, B, C . . . , and so on to make blended rice. Incidentally, the blending machine 63 may be swung to blend the polished rice. This blended rice is accommodated in the fourth accommodation tank 65 which is provided in a lower part of the blending section 6 and thereafter, is supplied to the wrapping machine 67, which wraps predetermined blended rice.

In the above description, the example in which each of the plural storage tanks or accommodation tanks is provided with the temperature sensor (in the drawing, however, only one temperature sensor is shown for simplification) to measure the temperature of the respective rice. However, the temperature of the rice may be measured by one temperature sensor after the rice which has been sent from the storage tanks or the accommodation tanks via the rotary feeders 2 is assembled.

As described hitherto, according to the present invention, the difference in temperature between the rice and the transportation air is controlled to be within the predetermined range when the rice is pneumatically transported from the unpolished rice storage tanks to the rice polishing machines, from the rice polishing machines to the rice bran removing machines, from the rice bran removing machines to the polished rice storage tanks, from the polished rice storage tanks to the blended rice accommodation tanks, and so on. Consequently, the occurrence of crushed granules and cracked granules of the rice during transportation can be reduced. Furthermore, the humidity of the transportation air is adjusted to be substantially equal to the equilibrium humidity of the rice, and consequently crushing of the rice can be further reduced.

Incidentally, in the above-described embodiment, the case where rice is transported is explained, but the present invention is applicable to gas transportation of other grains such as wheat and corn other than rice. Moreover, the transportation gas is not limited to air, and nitrogen gas, which is filled in the pipes in order to prevent explosion, can also be used for transportation.

As described hitherto, according to the present invention, the temperature of transported grain is measured and the difference in temperature between the grain and the transportation gas is controlled to be within a predetermined range when the grain is transported by means of the transportation gas flowing through the transportation pipes, which makes it possible to reduce crushing of the grain. In addition, the humidity of the transportation gas is controlled to be at a value substantially equal to the equilibrium humidity of the grain, which makes it possible to further reduce crushing of the grain and to obtain rice of good quality.

What is claimed is:

1. A transportation method for grain that transports grain by transportation gas flowing through a transportation pipe, comprising the steps of:

measuring temperature of the transported grain; and controlling temperature of the transportation gas so that a difference between the measured temperature of the grain and the temperature of the transportation gas is within a predetermined range within which occurrence of crushed granules and cracked granules from transport is minimized.

2. A transportation method for grain according to claim 1, wherein the difference between the measured temperature of the grain and the temperature of the transportation gas is within a range of ±15° C.

3. A transportation method for grain according to claim 1, further comprising the step of:

controlling humidity of the transportation gas to be at a value substantially equal to equilibrium humidity of the grain.

4. A transportation method for grain according to claim 1, wherein the grain is rice.

5. A transportation method for grain according to claim 2, further comprising the step of:

controlling humidity of the transportation gas to be at a value substantially equal to equilibrium humidity of the grain.

6. A transportation method for grain according to claim 2, wherein the grain is rice.

7. A transportation method for grain according to claim 3, wherein the grain is rice.

* * * * *